United States Patent
Loeppky et al.

(10) Patent No.: US 10,984,188 B2
(45) Date of Patent: Apr. 20, 2021

(54) METHOD, APPARATUS AND COMPUTER-READABLE MEDIA FOR CONVERTING STATIC OBJECTS INTO DYNAMIC INTELLIGENT OBJECTS ON A DISPLAY DEVICE

(71) Applicant: Nureva, Inc., Calgary (CA)

(72) Inventors: Lynette Dawn Loeppky, Calgary (CA); Erik Murray Benner, Calgary (CA); Erica Patricia Yorga, Calgary (CA)

(73) Assignee: NUREVA, INC.

( * ) Notice: Subject to any disclaimer, the term of this patent is extended or adjusted under 35 U.S.C. 154(b) by 0 days.

(21) Appl. No.: 16/258,954

(22) Filed: Jan. 28, 2019

(65) Prior Publication Data
US 2019/0236125 A1    Aug. 1, 2019

Related U.S. Application Data

(60) Provisional application No. 62/624,197, filed on Jan. 31, 2018.

(51) Int. Cl.
*G06F 17/00* (2019.01)
*G06F 40/186* (2020.01)
(Continued)

(52) U.S. Cl.
CPC .......... *G06F 40/186* (2020.01); *G06F 16/282* (2019.01); *G06F 16/9577* (2019.01);
(Continued)

(58) Field of Classification Search
None
See application file for complete search history.

(56) References Cited

U.S. PATENT DOCUMENTS

| 6,741,276 B1 | 5/2004 | Yonezawa |
| 7,024,456 B1 | 4/2006 | Simonoff |

(Continued)

FOREIGN PATENT DOCUMENTS

| WO | 2016197247 A1 | 12/2016 |
| WO | 2016197248 A1 | 12/2016 |
| WO | 2016197257 A1 | 12/2016 |

OTHER PUBLICATIONS

International Search Report and Written Opinion dated Apr. 10, 2019, from International Application No. PCT/CA2019/050101, 8 sheets.

*Primary Examiner* — Mustafa A Amin
(74) *Attorney, Agent, or Firm* — Katten Muchin Rosenman LLP

(57) ABSTRACT

Method, apparatus, and computer-readable media for converting static objects into dynamic intelligent object templates preferably provides structure and/or function whereby a first user displays a static object on a display. The user converts the static object into a dynamic template object having attributes of a group, the group including at least two of (i) notes, (ii) text boxes, (iii) images, (iv) sketches, (v) embedded links, (vi) inking objects, and (vii) sub-groups. Objects of the group inherit behaviors and attributes of the group including at least two of (i) color, (ii) naming convention, and (iii) positional attributes. The conversion occurs when the attributes and behaviors of the group are added to the static object, or when another underlying behavior is made available through interaction with the object. The dynamic template object is stored in a template library. Preferably, a second user can have the same conversion rights as the first user.

18 Claims, 16 Drawing Sheets

(51) Int. Cl.
  *G06F 16/28*   (2019.01)
  *G06F 16/957*  (2019.01)
  *G06F 16/958*  (2019.01)
  *G06F 40/14*   (2020.01)
  *G06F 40/117*  (2020.01)

(52) U.S. Cl.
  CPC .......... *G06F 16/986* (2019.01); *G06F 40/117* (2020.01); *G06F 40/14* (2020.01)

(56) References Cited

U.S. PATENT DOCUMENTS

| | | |
|---|---|---|
| 7,707,249 B2 | 4/2010 | Spataro |
| 2005/0091578 A1 | 4/2005 | Madan et al. |
| 2007/0208997 A1* | 9/2007 | Jiang .................... C12Q 1/6844 |
| | | 715/234 |
| 2008/0177771 A1 | 7/2008 | Vaughn |
| 2009/0271708 A1 | 10/2009 | Peters et al. |
| 2011/0035323 A1 | 2/2011 | Hamilton et al. |
| 2012/0179651 A1 | 7/2012 | Marchese |
| 2012/0246596 A1 | 9/2012 | Ording et al. |
| 2012/0324372 A1 | 12/2012 | Kowalkiewicz et al. |
| 2012/0331395 A2 | 12/2012 | Kummerfeld et al. |
| 2013/0080338 A1 | 5/2013 | Broekman et al. |
| 2018/0357032 A1 | 12/2018 | Popovich et al. |

* cited by examiner

Fig 2b. Prior Art

SWOT Analysis Template
State what you are assessing here
(This particular example is for a new business opportunity. Many criteria can apply to more than one quadrant. Identify criteria appropriate too your own SWOT situation.)

Default Content: Enter your content here

Strengths

Criteria examples
Advantages of proposition
Capabilities
Competitive advantages
USP's (unique selling points)
Resources, Assets, People
Experience, knowledge, data
Financial reserves, likely returns
Marketing – reach, distribution, awareness
Innovative aspects
Location and geographical
Price, value, quality
Accreditations, qualifications, certifications
Processes, systems, IT, communications Default content: Enter your content here

Weaknesses

Criteria examples
Disadvantages of proposition
Gaps in capabilities
Lack of competitive strength
Reputation, presence and reach
Financials
Own known vulnerabilities
Timescales, deadlines and pressures
Cash flow, start-up cash-drain
Continuity, supply chain robustness
Effects on core activities, distraction
Reliability of data, plan predictability
Morale, commitment, leadership
Accreditations etc Default content: Enter your content here

Opportunities

Criteria examples
Market developments
Competitors' vulnerabilities
Industry or lifestyle trends
Technology development and innovation
Global influences
New markets, vertical, horizontal
Niche target markets
Geographical, export, import
New USP's
Tactics: eg, surprise, major contacts
Business and product development
Information and research
Partnerships, agencies Default content: Enter your content here

Threats

Criteria examples
Political effects
Legislative effects
Environmental effects
IT developments
Competitor intentions - various
Market demand
New technologies, services, ideas
Vital contracts and partners
Sustaining internal capabilities
Obstacles faced
Insurmountable weaknesses
Loss of key staff
Sustainable financial backing
Economy - home, abroad
Seasonality, weather effects Default content: Enter your content here

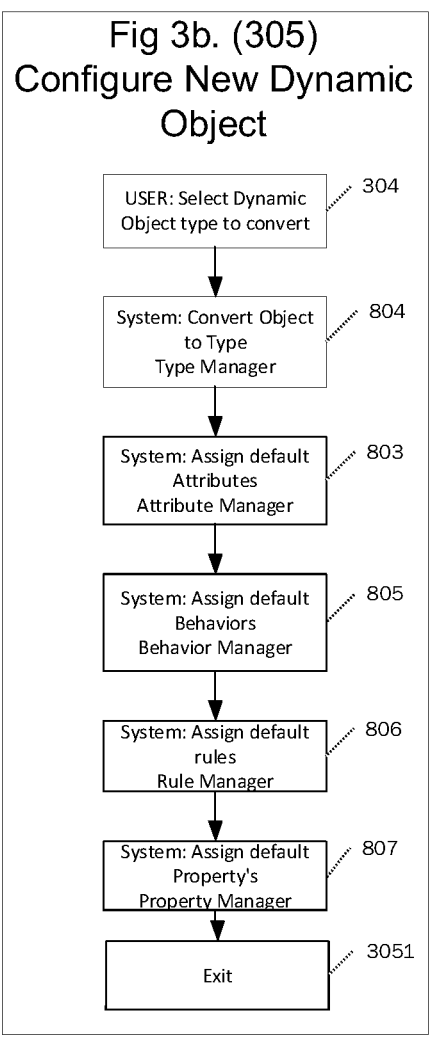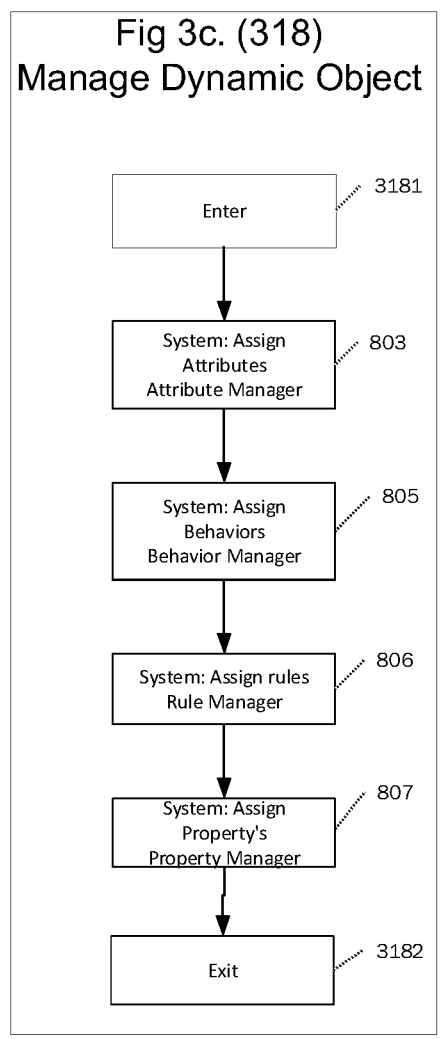

Example of Static Object to convert to dynamic object

Example of Static Object to convert to dynamic object

Example of Static Object to convert to dynamic object

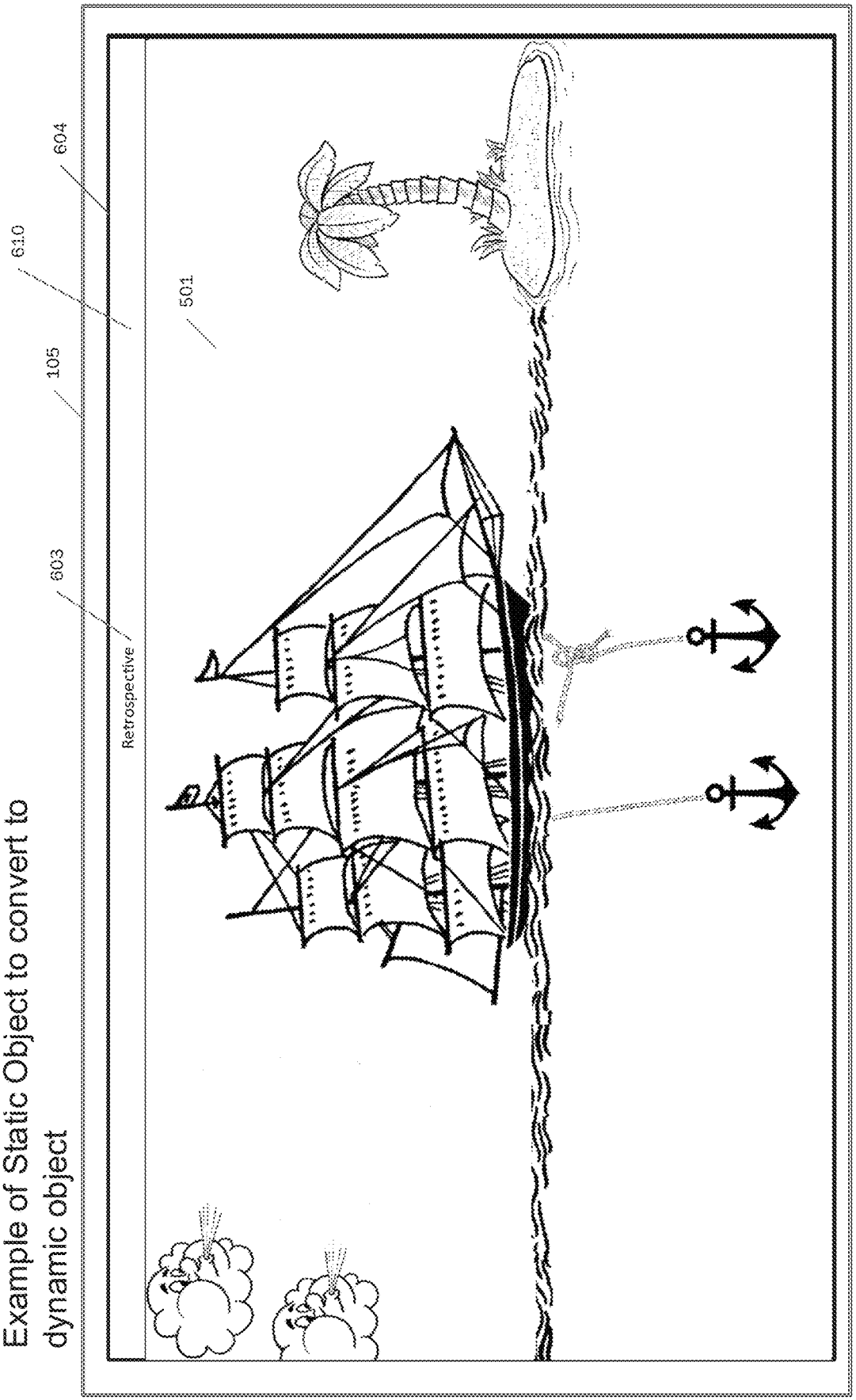
Fig 6a. Example of Static Object to convert to dynamic object

Example of Static Object to convert to dynamic object

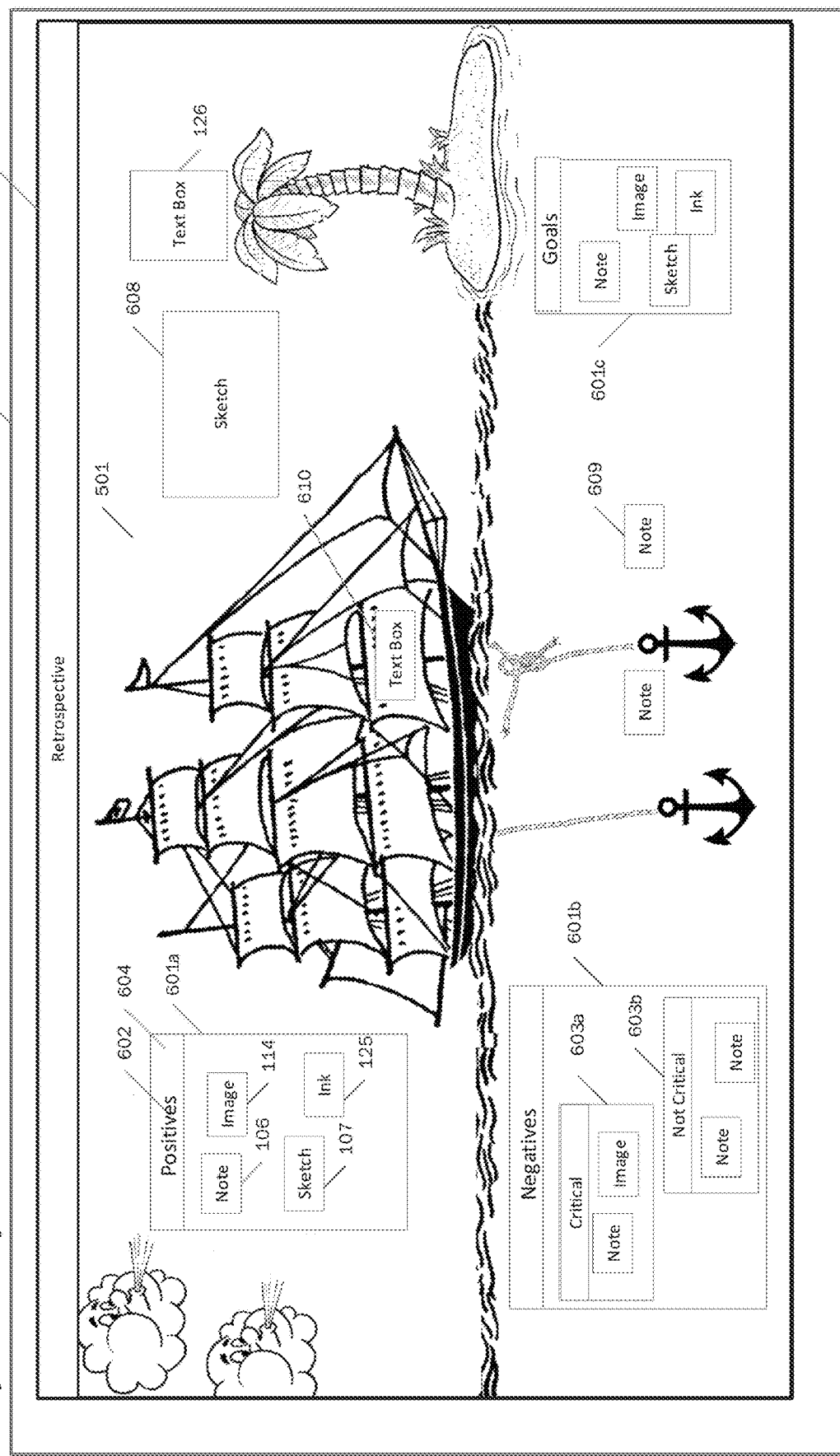
Fig 6c. Example of Static Object to convert to dynamic object

METHOD, APPARATUS AND COMPUTER-READABLE MEDIA FOR CONVERTING STATIC OBJECTS INTO DYNAMIC INTELLIGENT OBJECTS ON A DISPLAY DEVICE

This application claims priority to U.S. Provisional Patent Application No. 62/624,197, filed Jan. 31, 2018, the entire contents of which are incorporated herein by reference.

TECHNICAL FIELD OF THE INVENTION

The present invention generally relates to computer systems for the incorporation of static objects into electronic collaboration, information storing, editing and management systems to create dynamic intelligent objects. And, more specifically, the present invention is directed to systems and methods for using static object content as a baseline to create dynamically attributed and behaviorally driven intelligent objects which can be saved as templates. The templates can then be manipulated and reused in single user and multi-user environments where the users may be collocated in the same room and/or also distributed throughout any number of remote locations.

BACKGROUND

It is well known in the art to provide executable programs in computer systems to allow a user to take an electronic form or document that has been created for single use, and through a software application convert the document it to a template document object to be reused at a later date.

The typical application program creates a single purpose document utilizing a graphical, and/or scripting language to facilitate the process of creating the static structured content to be used in a template document object. This tends to be a prescribed process that directs the user to create and format the template document object from scratch within the limited options of format and style.

Such template document object creation processes are typically executed in an offline mode by a single user, and are not executed in real-time in concurrent multi-user collaboration, or shared information system environments.

Such template document creation systems typically build specific template objects of certain types. For example, a word processor will build word processing document templates objects, and a spreadsheet application will build specific spreadsheet document templates objects. To create a different type of template the user would need to utilize a different executable program.

For example, a word processor will typically create form-style templates objects where the user creates static text and inserts objects, and where another user of the template would be allowed to enter data into the form. Once the template has been created, it is saved for future use. If further changes need to be applied to the template object, the template object will need to be loaded into the template editor of the word processor application and modified offline of the editing and contribution process. This is problematic and is not adaptable to dynamic real-time collaboration environments.

Collaboration systems have been known in the current art for some time. The intent is to bring multiple users together to perform workflows such as, but not limited to, brainstorming, process improvement, and other information management sessions. There has been significant effort to transition these sessions from an analog format, such as sticky notes or white boarding, into a digital workspace with all the improvements that digital environments offer, such as persistent storage and remote user participation. Collaboration systems are also being used to share common data and support structured business processes throughout organizations on a global scale. An example of a business process would be a Lean Process workflow (e.g., Lean Manufacturing and/or Lean Production, etc.). As organizations move to further integrate collaboration systems into all aspects of their business processes there is a need to allow the organization to have a system that can adapt to their specific forms and process workflows quickly without the need to create new forms and/or process templates to work in the new software application environment.

Realtime collaboration systems in the current art may utilize an import feature with the intent of taking another application's documents and converting the documents to the new system applications pre-canned format and presentation. The import process tends to be driven by very specific rules which may not be appropriate and increase complexity and decrease user adoption and usability of the new system.

Templates objects commonly used in word processing, spreadsheet, and graphical presentation applications, while useful to facilitate the completion of forms, documents and presentations, creates a prescribed rigid format with limited usage in a free-flowing collaboration environment.

Further to standard template objects, static image files, such as JPEG, BMP, Tiff, etc., are incorporated as supporting content within a document template object, but not used as the basis of a template object, with the appropriate attributes and behaviors associated with a dynamic template object. As such, static images are typically used as an example of structure to then allow a user to create a specific purpose build template object in a dedication application in the current art.

If the image is less structured, such as photos of arbitrary objects or structures, they become even less appropriate for what is thought of template objects in the current art. In a collaborative environment, images objects can be very useful to structure and facilitate user input while allowing for a wide degree of data display formats and potentially dynamic hieratical data structures.

The current art is not able to properly adapt and dynamically utilize static objects and transition the content to a dynamic intelligent template object format.

As data objects and process management becomes more complex, the inefficiencies in the current art become even more pronounced. As collaboration and information management systems become larger and more complex, limitations in the current art become problematic in how intelligent objects and process flows are created and managed, especially under concurrent and remote user situations.

The present invention is intended to overcome one or more of the problems discussed above.

SUMMARY OF THE INVENTION

The present invention allows users to incorporate new or pre-existing static content into electronic collaboration, information storing, editing, and managing computer systems for the purpose of creating dynamic intelligent objects. And, more specifically, it is an object of the invention to utilize static object content, that would not normally have dynamic object attributes and/or behaviors, as a baseline to create dynamically attributed and behaviorally driven intelligent content objects which can then be saved as templates that can then be manipulated and reused in single-user and multi-user environments. This ability to create dynamic template objects from static object types overcomes the limitations of the prior art which is limited to creating new forms via limited fixed-format importing capabilities.

According to one aspect of the present invention, the static object is converted into an object with the properties of a group. The system is able to accept any object type and turn it into a dynamic object with attributes and behaviors of one or more group(s). Groups can contain such objects as, but not limited to, sub-groups, notes, text boxes, images, sketches, embedded links, and inking objects. A property of the group is the ability to have groups within groups which forms a nested hierarchal behavior. Objects contained in the group may inherit specific behaviors and attributes such as, but not limited to, colour, naming convention, and positional attributes. There may be multiple sub-groups at the same layer and other groups with in groups to form deeper nested layers. The ability to have flat and nested groups allows the system to handle a variety of static object types and create complex dynamic data objects with the ability to save the data objects as templates. Furthermore, the complex dynamic data objects are able to be exported to third party programs using known-in-the-art standard protocols such as, but not limited to, for example, delimited text and xml schemas, which will allow for accurate representation of the data layers and object relationships in the third-party program. [Wonderful Summary paragraph.]

According to a further aspect of the present invention, the static object is preferably an image object that is transformed into a dynamic image object through a single action by the user. A static image object is transformed into a dynamic object when the attributes and behaviors of a group are added to the static image-object, or when another underlying behavior is made available through interaction with the image object. The static image-object may contain areas that are used to demarcate one section of the image from another. The content of the image object can be used as reference to determine appropriate grouping boundaries. Other related objects such as text, notes, images etc. can be dragged onto (or placed on) the dynamic image object. The added objects that overlay the dynamic image object can be removed or repositioned by any of a multiplicity of users at any time.

Users can start with static images and, as the process develops, static image objects can be converted to dynamic, intelligent image-object thus supporting a dynamic creative process as a part of individual or team activities where a template was not the initial purpose of the work effort.

Dynamic intelligent objects have applied attributes and behaviors, such as but not limited to color, transparency, positional information, object contents and object order hierarchy which includes multiple nested objects, and are able to determine the attributes and behaviors inherent to objects that are placed on, or overlaid onto the dynamic intelligent object. An intelligent, dynamic image-object remains in a dynamic, intelligent state at all times, allowing for users to update and edit the image-object even within the course of normal data entry. The intelligent dynamics of an image-object are related to the ability of the object to automatically manage attributes, positioning and layering information within the object without the user needing to configure or predefine structure or content limitations.

According to another aspect of the present invention the dynamic template objects can be saved to a template library to be used and edited by other users.

According to yet another aspect of the present invention, static objects contained on the digital collaboration workspace can be accessed concurrently by multiple users in real-time and in remote locations to build, use, and save dynamic template objects.

According to yet further aspect of the present invention, static objects contained on the digital collaboration workspace can be accessed concurrently by multiple users in real-time and in remote locations to build, use, and save dynamic template objects that can be used to create exportable dynamic template objects, which can be static and/or dynamic in content and behavior. For example, a static version of the export would be a PDF file that may be read only, or a PDF file that may allow for data entry in specific fields. The export capability would also support standard office programs such as MS Excel and MS Word which would allow for raw data access and support of the full hieratical and data structure format of the original dynamic template object.

The present invention provides customizable, intelligent templates in Span™ software Span™ software is a cloud-based large format horizontally scrollable up to 200 feet of digital visual collaboration work space that can be accessed simultaneously on large multiuser interactive displays, personal computers and personal devices. The dynamic functionality makes it easy for the growing user base to leverage their existing lean, agile, design, and business processes within the Span™ software. For example, paper-based templates or physical project boards commonly used in sprint planning, Kanban and pull planning can be easily transformed into customizable digital templates within a Span™ canvas. Images, such as an overhead view of a property development site, can be transformed into an intelligent template that is divided into color coded zones for visual review or managing project progress. Users can create intelligent templates from documents produced in applications like Microsoft® PowerPoint® and Excel®, and automatically assign color to notes that are placed within groups and subgroups. This provides users with rich project information at a glance. Users will also be able to customize stock templates currently available in Span™ software, such as SWOT (Strength, Weaknesses, Opportunities, Threats) analysis and fishbone diagrams. These intelligent templates in Span™ software appeal to the growing number of process-driven teams that regularly meet in physical and virtual spaces to prioritize, plan, track, and visualize contributions from team members. The preferred embodiments comprise both algorithms and hardware accelerators to implement the structures and functions described herein.

According to another aspect of the present invention, a method for creating dynamic, intelligent templates for displaying objects on at least one computer-controlled display includes a first user displaying a static object on the at least one computer-controlled display. Preferably, the first user preferably converts the static object into a dynamic template object having attributes of a group, the group including at least two of (i) notes, (ii) text boxes, (iii) images, (iv) sketches, (v) embedded links, (vi) inking objects, and (vii) sub-groups. Preferably, the objects of the group inherit specific behaviors and attributes of the group including at least two of (i) color, (ii) naming convention, and (iii) positional attributes. Preferably, the conversion occurs when at least one of: (i) the attributes and behaviors of the group are added to the static object, and (ii) when another underlying behavior is made available through interaction with the object. Preferably, the dynamic template object is stored in a template library. Preferably, a second user performs at least one of: (i) accessing the dynamic template object stored in the template library, (ii) making further change to the attributes or the contents of the accessed dynamic template object, (iii) saving a further changed dynamic template object in the template library, and (iv) displaying the accessed dynamic template object on the at least one computer-controlled display.

According to another aspect of the present invention, apparatus for creating dynamic, intelligent templates for displaying objects on at least one computer-controlled display, includes at least one processor configured for a first user to display a static object on the at least one computer-controlled display. The at least one processor being further configured for the first user to convert the static object into a dynamic template object having attributes of a group, the group including at least two of (i) notes, (ii) text boxes, (iii) images, (iv) sketches, (v) embedded links, (vi) inking objects, and (vii) sub-groups. The at least one processor being further configured such that objects of the group inherit specific behaviors and attributes of the group including at least two of (i) color, (ii) naming convention, and (iii) positional attributes. The at least one processor being further configured such that the conversion occurs when at least one of: (i) the attributes and behaviors of the group are added to the static object, and (ii) when another underlying behavior is made available through interaction with the object. The at least one processor being further configured such that the dynamic template object is stored in a template library. The at least one processor being further configured such that a second user is enabled to perform at least one of: (i) accessing the dynamic template object stored in the template library, (ii) making further change to the attributes or the contents of the accessed dynamic template object, (iii) saving a further changed dynamic template object in the template library, and (iv) displaying the accessed dynamic template object on the at least one computer-controlled display.

According to another aspect of the present invention, program code embodied in a non-transitory computer readable medium for creating dynamic, intelligent templates for displaying objects on at least one computer-controlled display, wherein the program comprises instructions causing at least one processor to (a) enable a first user to display a static object on the at least one computer-controlled display; (b) enable the first user to convert the static object into a dynamic template object having attributes of a group, the group including at least two of (i) notes, (ii) text boxes, (iii) images, (iv) sketches, (v) embedded links, (vi) inking objects, and (vii) sub-groups; (c) wherein objects of the group inherit specific behaviors and attributes of the group including at least two of (i) color, (ii) naming convention, and (iii) positional attributes; (d) wherein the conversion occurs when at least one of: (i) the attributes and behaviors of the group are added to the static object, and (ii) when another underlying behavior is made available through interaction with the object; (e) cause the dynamic template object to be stored in a template library; and (f) enable a second user at least one of: (i) accessing the dynamic template object stored in the template library, (ii) making further change to the attributes or the contents of the accessed dynamic template object, (iii) saving a further changed dynamic template object in the template library, and (iv) displaying the accessed dynamic template object on the at least one computer-controlled display.

BRIEF DESCRIPTION OF THE DRAWINGS

FIGS. 2a and 2b are illustrations of prior art template objects

FIGS. 3a, 3b, and 3c are flow charts depicting the logic flow for preferred dynamic intelligent object creation from a static object.

FIGS. 6a, 6b and 6c are workflow illustrations of an image being converted to a dynamic intelligent object.

DETAILED DESCRIPTION OF THE PRESENTLY PREFERRED EXEMPLARY EMBODIMENTS

With reference to the drawings, non-limiting illustrative embodiments will now be described.

The present invention is directed to apparatus and methods that enable individual users and/or groups of people, and or off-line users known as "participants", to join together over a network, such as the Internet or similar electronic channel(s), in a remotely-distributed, real-time fashion employing personal computers, network workstations, large-screen displays, and/or other similarly connected appliances, to maximize the inclusion of static digital work space objects for the creation of dynamic intelligent workspace objects and templates.

Advantageously, embodiments of the present invention pertain to utilizing dynamic intelligent objects to provide systems and methods to give users a method to utilize static objects types to create, modify, delete, and manipulate all properties of dynamic intelligent objects to facilitate free-form reusable dynamic image-groups that can be created from static objects in a single or multiuser digital workspace environment.

While the description below is given with respect to a real-time multiuser collaborative environment where there may be a plurality of users located in the room and at remote locations, other more straightforward uses may also apply without departing from the spirit or scope or the attached claims. For example, the application program may be run on a single computational device (one or more processors) in standalone mode. The cloud/server allows for a plurality of remote locations and devices to share the same digital workspace and objects for a contiguous and consistent experience and presentation with the ability to sync content from a stand-alone user instance at a later time.

A notable challenge to creating dynamic template objects is the ability of the system to adapt to a multitude of file formats, data structures, and pre-existing custom data objects, resulting in complex implementations while maintaining sufficient capabilities and ease-of-use for the end user.

The words computational device, computer and device are used interchangeably and can be construed to mean the same thing.

Figure 1A:
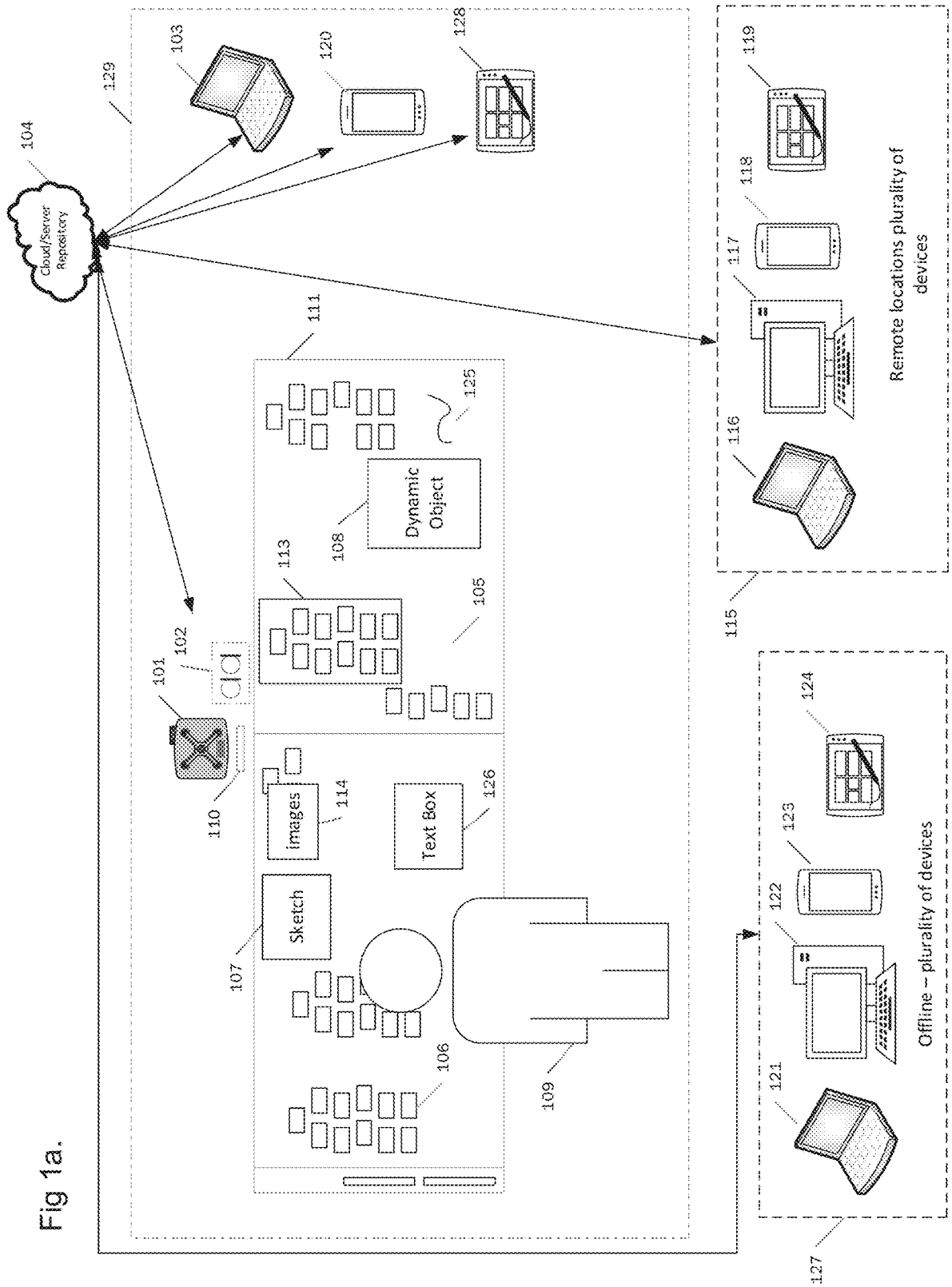
FIGS. 1a and 1b are illustrations depicting a presently preferred system configuration.
Figure 1B:
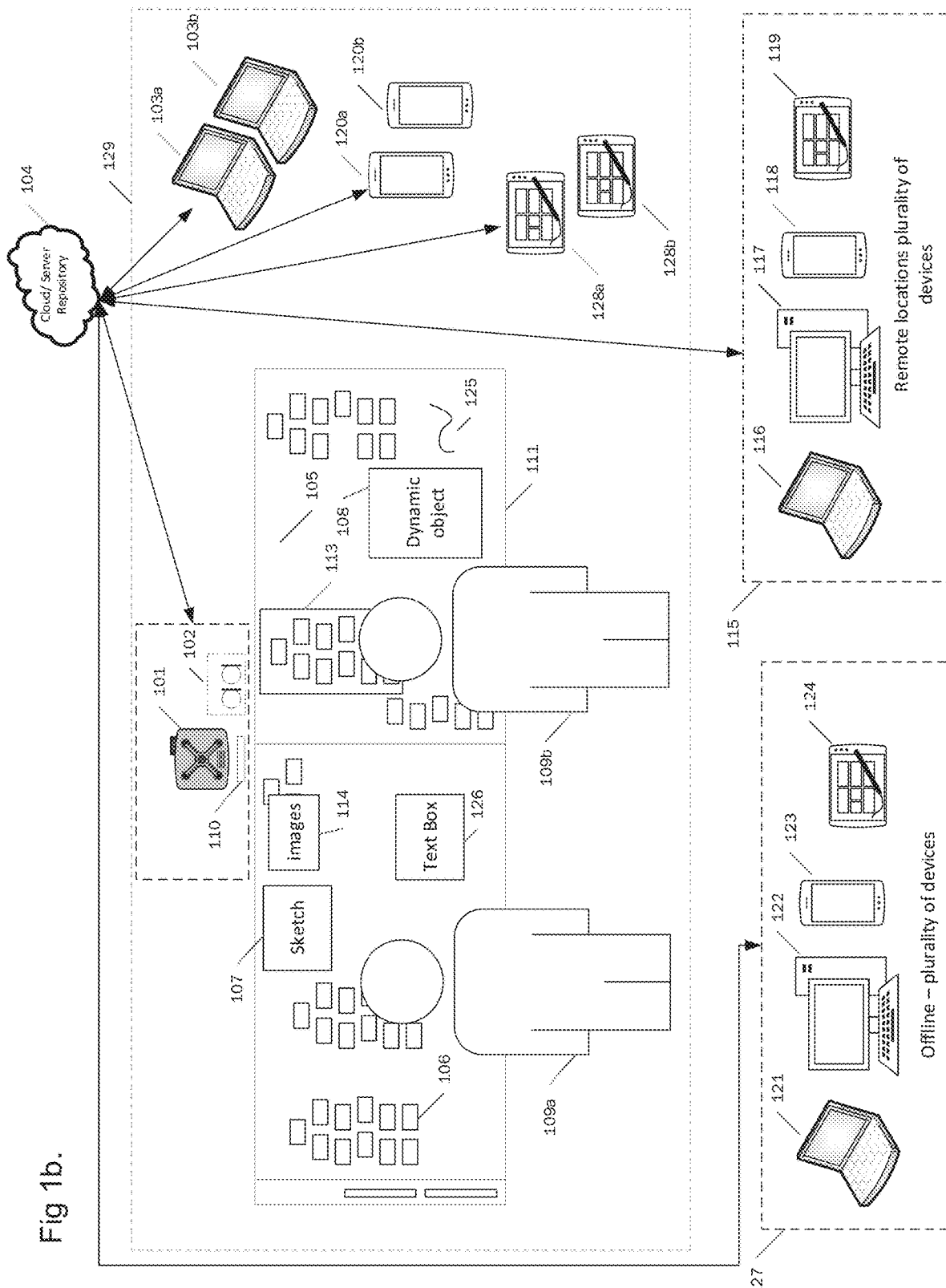

FIGS. 1a and 1b illustrate a system setup that a user might interact with according to an embodiment of the invention. The computational device, or computer, could be any standard PC either desktop 117, 122 or laptop 103, 116, 121 or a smaller device 118,119,120, 123,124, 128 that might have an integrated display and touch screen (like a tablet). The system may be used in a stand-alone offline 127 capacity syncing to the cloud/server when a connection is available, or in a real-time online 115 capacity with a cloud/server 104. Users of the system may be local to the room 129 and/or in a remote location 115 connected through a cloud/server 104 architecture operating in a concurrent multiuser environment. The cloud/server hosts the active digital workspace content of which an example is shown on the display 111

The computational devices may include one or more processors, a CPU, RAM, storage, video output, audio sound capability and the ability to connect with external peripherals, such as a display, touch system and microphone. Preferably, the computer processor(s) are configured to read program code from one or more computer readable media (such as memory ICs, CDs, DVDs, tape, etc.). The functions described herein may be embodied in software, hardware, firmware, or any combination thereof.

A "device" in this specification may include, but is not limited to, one or more of, or any combination of processing device(s) such as, a cell phone, a Personal Digital Assistant, a smart watch or other body-borne device (e.g., glasses, pendants, rings, etc.), a personal computer, a laptop, a pad, a cloud-access device, a white board, and/or any device capable of sending/receiving messages to/from a local area network or a wide area network (e.g., the Internet), such as devices embedded in cars, trucks, aircraft, household appliances (refrigerators, stoves, thermostats, lights, electrical control circuits, the Internet of Things, etc.).

An "engine" is preferably a program that performs a core function for other programs. An engine can be a central or focal program in an operating system, subsystem, or application program that coordinates the overall operation of other programs. It is also used to describe a special-purpose program containing an algorithm that can sometimes be changed. The best-known usage is the term search engine which uses an algorithm to search an index of topics given a search argument. An engine is preferably designed so that its approach to searching an index, for example, can be changed to reflect new rules for finding and prioritizing matches in the index. In artificial intelligence, for another example, the program that uses rules of logic to derive output from a knowledge base is called an inference engine.

As used herein, a "server" may comprise one or more processors, one or more Random Access Memories (RAM), one or more Read Only Memories (ROM), one or more user interfaces, such as display(s), keyboard(s), mouse/mice, etc. A server is preferably apparatus that provides functionality for other computer programs or devices, called "clients." This architecture is called the client-server model, and a single overall computation is typically distributed across multiple processes or devices. Servers can provide various functionalities, often called "services", such as sharing data or resources among multiple clients, or performing computation for a client. A single server can serve multiple clients, and a single client can use multiple servers. A client process may run on the same device or may connect over a network to a server on a different device. Typical servers are database servers, file servers, mail servers, print servers, web servers, game servers, application servers, and chat servers. The servers discussed in this specification may include one or more of the above, sharing functionality as appropriate. Client-server systems are most frequently implemented by (and often identified with) the request-response model: a client sends a request to the server, which performs some action and sends a response back to the client, typically with a result or acknowledgement. Designating a computer as "server-class hardware" implies that it is specialized for running servers on it. This often implies that it is more powerful and reliable than standard personal computers, but alternatively, large computing clusters may be composed of many relatively simple, replaceable server components.

The servers and devices in this specification typically use the one or more processors to run one or more stored "computer programs" and/or non-transitory "computer-readable media" to cause the device and/or server(s) to perform the functions recited herein. The media may include Compact Discs, DVDs, ROM, RAM, solid-state memory, or any other storage device capable of storing the one or more computer programs.

The computational devices 103,120,128 are shown connected to an interactive projector 101 and the associated touch detection system 110, and microphone system 102 though a cloud/server 104. The system would not be limited to projection systems and could be any interactive display or standard computer system display and input device. An "interactive display" in this specification may include, but is not limited to, one or more of, or any combination of interactive display devices(s) used to receive an interactive event on an interactive display such as, resistive, surface acoustic wave, capacitive, surface capacitance, projected capacitance, mutual capacitance, self-capacitance, use of styli on capacitive screens, infrared grid, optical imaging, dispersive signal technology, acoustic pulse recognition, gesture based controllers, depth aware cameras, wired gloves, stereo cameras, and/or any interactive display device capable of sending/receiving interactive events and messages to/from a local area network or a wide area network (e.g., the Internet), such as devices embedded in cars, trucks, aircraft, household appliances (refrigerators, stoves, thermostats, lights, electrical control circuits, the Internet of Things, etc.).

The user 109 preferably interacts with the graphical user interface 111 with digital workspace 105 objects—such as, but not limited to, notes 106, sketches 107, dynamic objects 108, groups 113, images 114, and ink objects 125. Although those specific objects are shown, all standard operating system objects such as desktops, files, hyperlinks, windows, icons, applications, programs, and equivalent objects are within the scope of this invention. The user 109 is shown to be interacting with the display 111 which is displaying the digital workspace application 105. The objects are preferably contained in an active digital workspace 105 that is hosted via the cloud/server 104.

Contained within the room 129 are a plurality of other users on computational devices 103,120,128. The users of these devices are collocated in the room and are able to see, edit, manage, create, and delete any and all objects displayed on the display 111 concurrently in real-time using the active digital workspace 105, for example, described in U.S. patent application Ser. No. 15/735,551, filed Dec. 11, 2017 for SYSTEM, APPARATUS, AND METHOD FOR FACILITATING AND PERPETUATING A COLLABORATIVE IDEATION SESSION, the entire contents of which are incorporated herein by reference. In this specification digital workspace and program application are construed to mean the same thing and are used interchangeably throughout the specification.

Remote users 115 on a plurality of remote computational devices 116,117,118,119 can be connected to the cloud/server 104 to concurrently interact with the active digital workspace content 105.

FIG. 1*b* illustrates that the system being used in a concurrent multiuser environment. Specifically, multiusers 109*a*, 109*b* can be located at the large collaboration wall system display 111, interacting with the digital workspace application program 105 at the same time. Further, the multiusers 109a, 109b can be concurrently interacting with the same objects 106,107,108,113,114,125,126 or different objects of the same type. Furthermore, a plurality of users of the system can be located in the same room 129 using a plurality of computer devices 103a, 103b, 120a,120b, 128a, 128b loaded with the digital workspace application program 105 connected through the cloud/server 104. And furthermore, the plurality users of the system can be located remotely 115 using a plurality of computer devices 116, 117,118,119 loaded with the digital work space application program 105 connected through the cloud/server 104. Dynamic intelligent objects 108 can be created and managed concurrently by multiple users of the system in real-time. For the purpose of this specification, user, users, and participates can be construed to be the same, and can be interchanged throughout the specification. The application is designed for concurrent multiuser usage and there are no specific constraints or operations outlined that are limited to a single user action or function.

The application program preferably supports an off-line mode 127 which allows users to interact with the application program 105 to utilize the application program objects 107,108, 114,126,113,108,125 in a single user environment which is not real-time, and may be later connected through the cloud/server 104 to sync the application data.

Figure 2A:
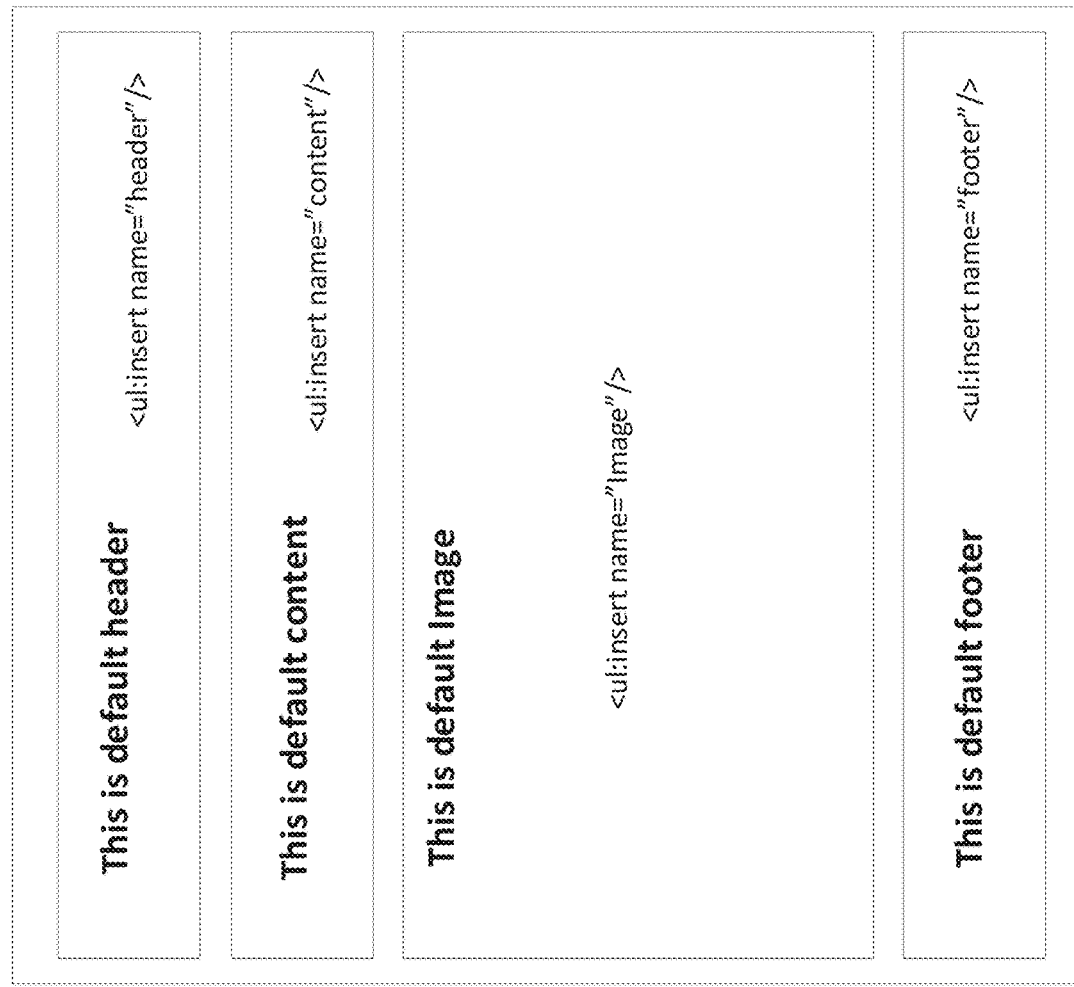

FIG. 2a depicts a typical template object that is present in the prior art. This type of template is typically created in a single user program application. The user of the program, either through a scripting language or a graphical drag and drop scenario, will preferably drop desired objects into a screen layout that resembles a form or something similar. The program application will guide the user through a prescribed process. Preferably, the user will set specific fields as read-only while other fields can be set to modifiable where an end user of the template can insert textual content. The user creating the template will preferably save the template to a specific file or type for another user to open and edit the predefined allowable content. This type of form is typically static once it is saved, and if a user of the template wants to modify the form in any way, the user will need to open the template in an edit mode and make the appropriate adjustments. Once those adjustments are completed, the user modifying the template will save the new modified template. This is a very prescribed process that does not lend its self to free-flowing processes or environments where fixed canned templates may not be appropriate or available such as, but not limited to, concurrent user, collaborative, and business process structured environments.

FIG. 2b illustrates an example of a more complicated template in the prior art. Although the structure of the template is more complex, the template shares the same limitations and constraints of the template in FIG. 2a. The end user is limited to entering exact matching data into predefined fields, and data entry outside of the fixed construct and allowable editable fields is not possible.

Figure 3A:
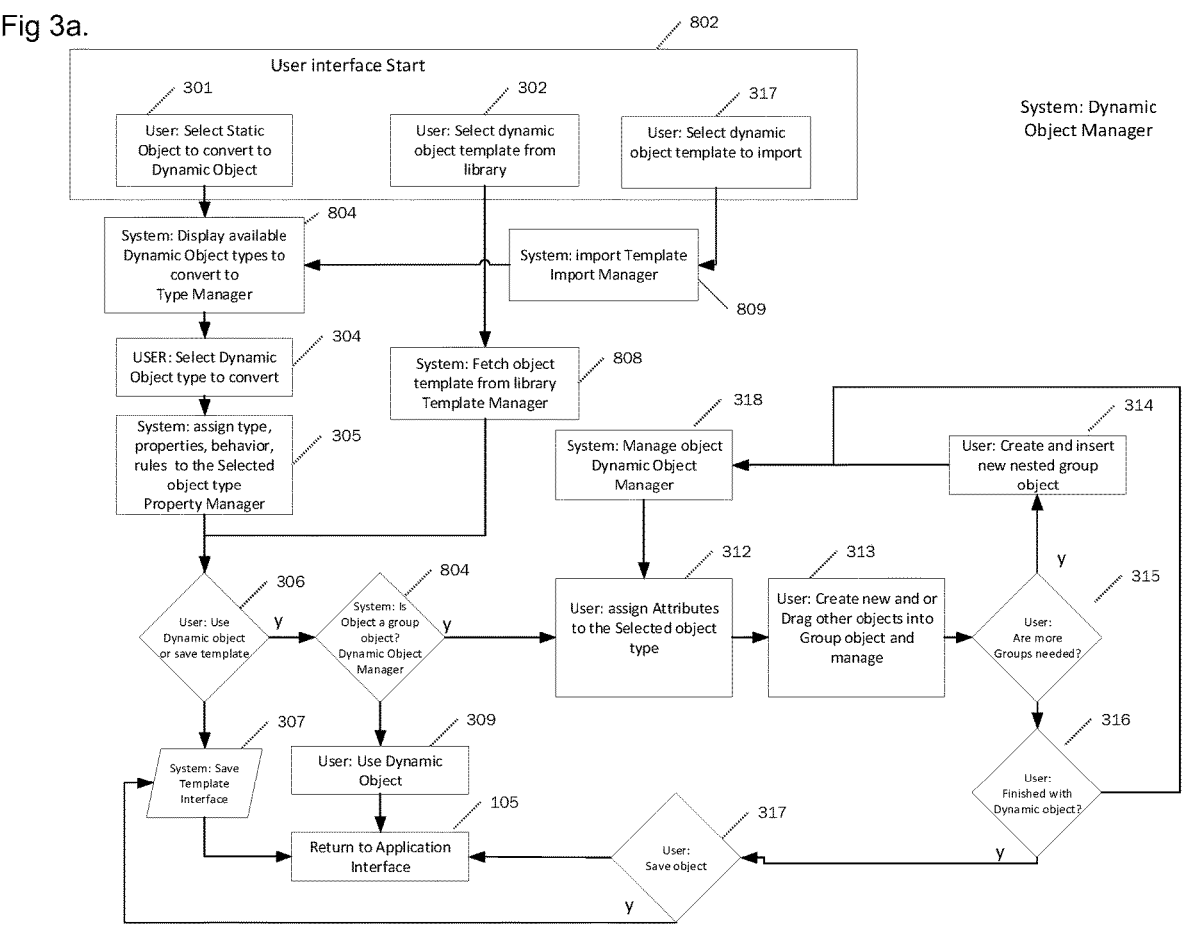

FIG. 3a is a logic flow map depicting how the dynamic intelligent object manager 801 preferably works within digital workspace application program 105, according to an embodiment of the subject invention.

According to the present embodiment, the program application user preferably has three methods of selecting an object for use as a dynamic intelligent object through the dynamic object manager 801 interface 802. The user can select a static object, step 301 from the digital work space 111, or the user can select from a template library 808, step 302 of saved dynamic template objects via the dynamic object interface 802, or the user can import a template, step 317. A static object can comprise images, documents, files, notes, sketches, text boxes, and any other objects contained in a digital workspace, as defined in FIG. 1a. After the user selects the desired static object, the dynamic object display manager 801 displays to the user the available dynamic object types to convert to, through the Type Manager 804. The user preferably has the choice of selecting from a list. For example, the list may include, but is not limited to, (Image group, Group, Free-Form (such as inked)). Once the user selects the desired object type in step 304, the dynamic object manager 801 sets the appropriate type 804, attributes 803, rules 806, properties 807, and behaviors 805 to the selected object in step 305. For example, attributes may comprise, but are not limited to color, label name, show/hide label and show/hide pins. Rules may comprise, but are not limited to, user-defined macros that will allow for customization of the attributes and behaviors based on state change, position and specific content within the template. Inserting the word "red" into the intelligent container could trigger a user defined macro changing the background to "red". Examples of properties are location, size, z-order, author, layer assignment, objects contained within the hierarchy. Examples of behaviors are to change the color, appearance, size or position of nested elements in reference to their specific Group that they have been inserted into within the intelligent dynamic object. The selected object has now been converted to an intelligent dynamic object. For the purpose of this invention dynamic object, intelligent dynamic object, and intelligent dynamic template object are construed to mean the same thing and are used interchangeably throughout the specification.

The user now preferably has the option 306 to save the dynamic object to a template file and store 307 in the template library 808, or the user can continue to use the dynamic intelligent template object and the digital work space 105.

For the purpose of an exemplary description of this embodiment of the invention, the dynamic object type selected was "image-group 604". An image-group 604 is described as an object type with size, position, colour, background image, label name, and other object properties and attributes. An image-group object behaves as a container for other objects, enabling a hierarchical layout of objects in the digital work space. Assigning dynamic object attributes to the image-group enables additional dynamic functionality on this object The users can now assign specific attributes 312 to an image-group 604. The users can assign the for example, the color and the label name of the image-group 604. The users can also set the properties 807, for example, the size and position on the digital workspace 111. The users can modify the attributes 803 and properties 807 at any time. Once the user sets the image-group 604 up, the users can now put content into the image-group 604. This is preferably done by dragging and dropping step 303 digital workspace objects within the image-group 604 boundaries. The objects, where appropriate, will inherit the group properties and attributes. For example, assigning a colour to an image-group will cause that colour to automatically apply to all content objects placed within the objects boundaries.

The users will continue to interact with the image-group 604 by inserting, deleting, and arranging the digital work space object content, step 313. If no groups are added, step 315, and the users are continuing, step 316, to interact with the image-group object 604, the dynamic object manager

801 will manage all aspects of the image-group 604, step 318 in real-time keeping all aspects of the image-object current, which returns back to step 312.

The users can also, through the interactive process, decide at step 315 to add group objects 113 to within the image-group 604. The user can add groups objects 113 at the same layer, or as nested group objects step 314, within a group that has been previous inserted. This creates a hierarchical layering within the image-group 604 that can be used to organize and assign group properties specific to a particular area on the image-group 604. The hierarchical properties can be exported 810 to common data export formats for later use and analysis. As the user inserts groups objects 113 and digital workspace objects, the dynamic object manager 801 preferably processes the image-group 604 managing the attributes 803, rules 806, properties 807, and behaviors 805, step 318.

Once the users are done step 316, interacting with the image-group, the users have the option to return to the application program interface 105 or save the image-group 604 as a new dynamic intelligent template object, step 307. Once the image-group has been saved as an intelligent dynamic template object, the users can continue to use the program application 105 to interact with the digital workspace content.

If the user selects at the start, through the dynamic object interface 802, to fetch at step 302 a dynamic intelligent object template from the template library 809, the system will fetch the selected template 809 and then enter the logic flow at step 306, at which point the process continues as per previously described.

If the user selects at the start through the dynamic object interface 802 to import, step 317, an object template into the dynamic object manager 801 the system will import the object template, step 809 and exit to step 804 at which point the template is converted to the user selected template type and the process continues as per previously described.

FIG. 3b (305) illustrates the logic flow steps when a new object has been assigned an intelligent object of specific type. The dynamic object manager will preferably first convert the static object to the user defined type via the type manager 804. The attribute manager 803 will preferably assign the default attributes to the selected dynamic object type. The behavior manager 803 will preferably assign the default behaviors associated with the selected dynamic object type. The rules manager 806 will preferably assign the default rules associated with the selected dynamic object type. The property manager 807 will preferably define the property's associated with the selected dynamic object type. For example, the default colour attribute is set to transparent and the default label name property is "New Group". Once all aspects of the object have been configured via the dynamic object manager 801 the manager will preferably exit 3051 and continue the logic flow.

FIG. 3c (318) illustrates the logic flow steps when a dynamic object has been interacted with through the normal course of user interactions. The logic flow preferably enters through step 3181 and passes the dynamic object through a set of steps to manage the configuration of the dynamic object in real-time. This step is preferably invoked in real-time at any point the dynamic object is interacted with. The attribute manager 803 will configure the selected dynamic object type to the user defined attributes. The behavior manager 803 will preferably adjust the behaviors of the dynamic object based on the user attributes defined by the user. The rules manager 806 will preferably apply the rules associated with the modified selected dynamic object type. The property manager 807 will preferably adjust the property's associated with the selected dynamic object type. Once all aspects of the object have been configured via the dynamic object manager 801 the manager will preferably exit 3182 and continue the logic flow.

Figure 4:
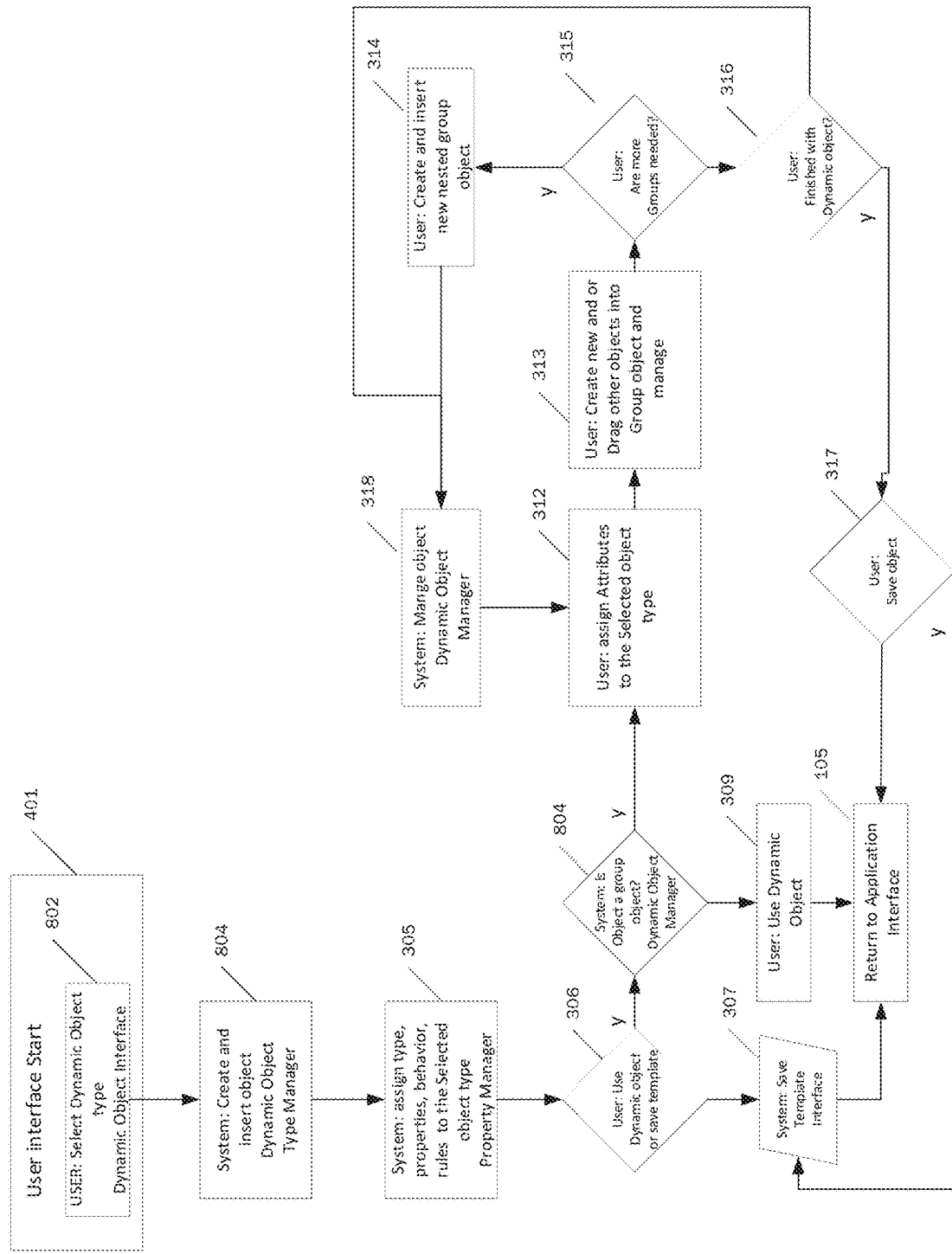
FIG. 4 is a flow chart depicting the logic flow for preferred new dynamic object creation.
Figure 7A:
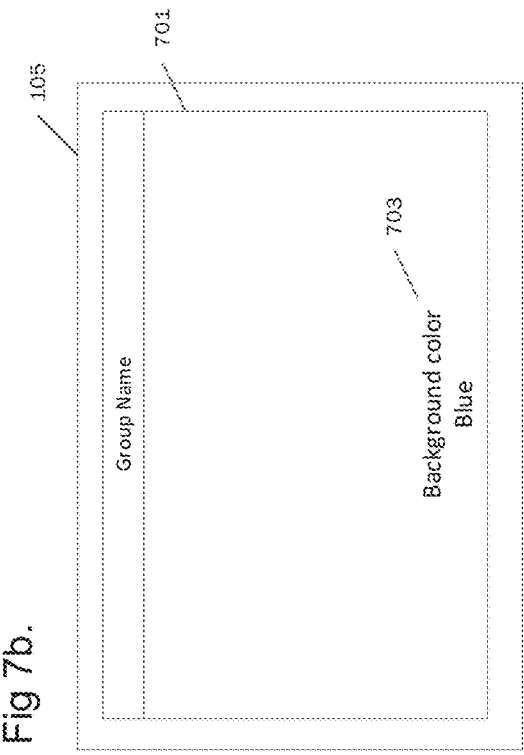
FIGS. 7a, 7b, 7c and 7d are workflow illustrations of creating a new dynamic intelligent object.
Figure 7B:
Figure 7C:
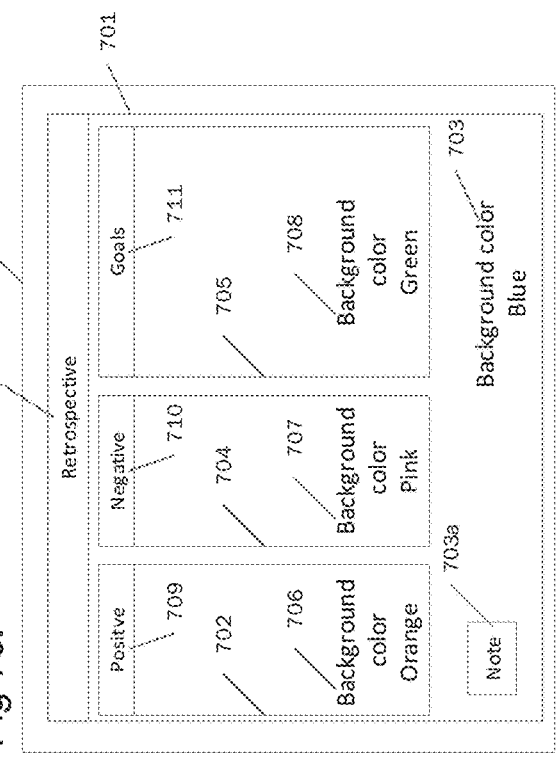

FIG. 4 is a diagrammatic illustration of the logic flow for creating a new intelligent dynamic group object. This program logic flow shares many aspects of the previously defined logic flow in FIG. 3a. The user via the digital work space 105 preferably accesses the dynamic object interface 802 contained in the dynamic object manager 801 to select the group object 113 to create a new dynamic intelligent group template object 701 on the digital workspace 105, step 401. Once the user selects the intelligent group object 113 the system logic flow preferably proceeds to access the type manager 804 to create the intelligent dynamic group object on the digital workspace 105. The logic flow continues to step 305, to set up the intelligent dynamic group object and the logic flow preferably continues as previously defined in FIGS. 3a, and 3c. FIGS. 7a, 7b and 7c further define the intelligent dynamic group object. The intelligent dynamic group object can be saved as a template object as defined in step 307.

Figure 5A:
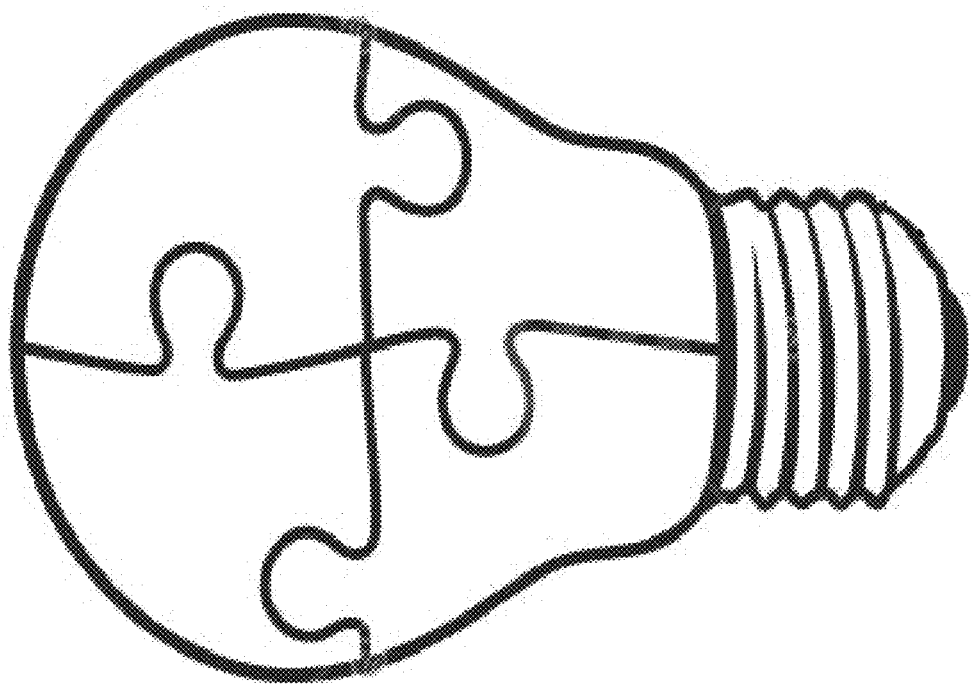
FIGS. 5a, 5b and 5c are illustrations of images that can be converted to dynamic intelligent objects.
Figure 5B:
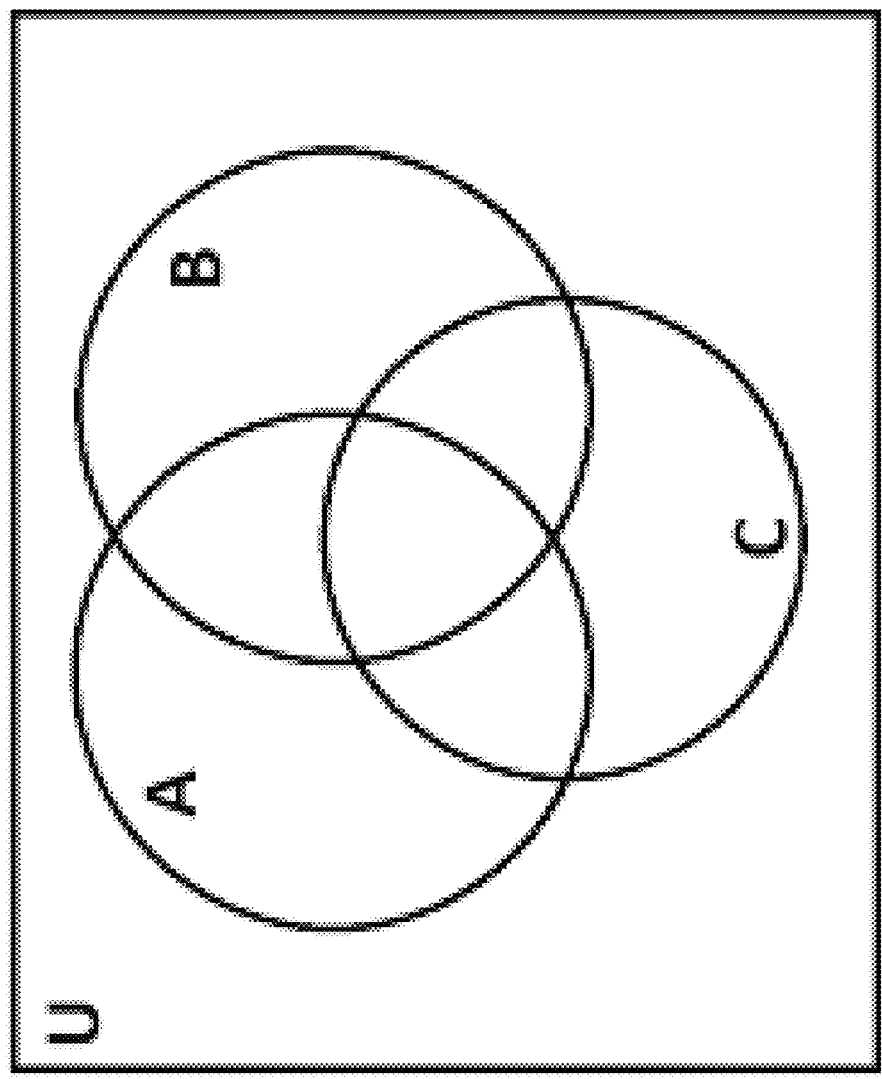
Figure 5C:
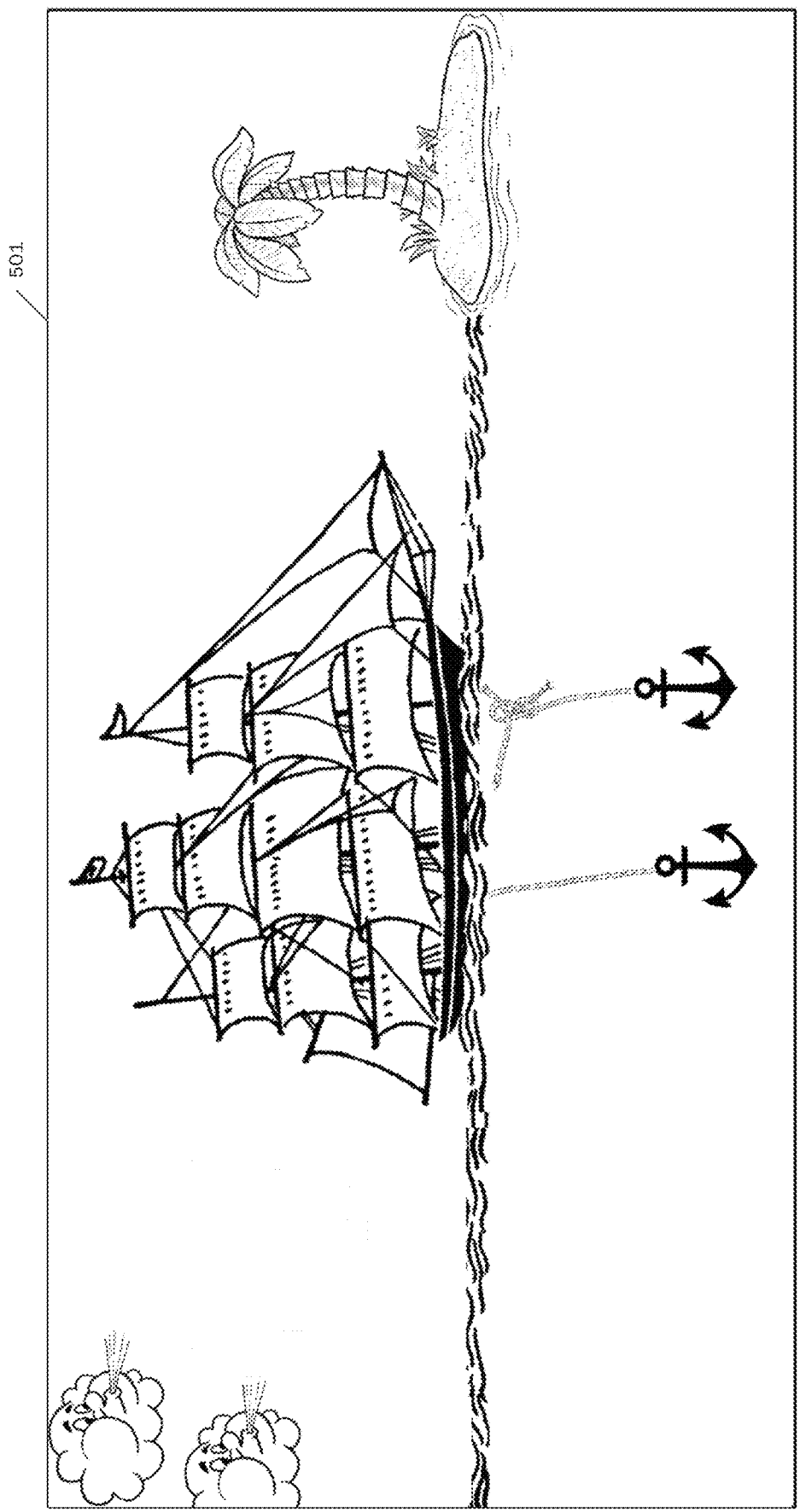

FIGS. 5a and 5b and 5c are illustrations of static objects types that are representative of objects that would be used as the basis of intelligent image-groups. Types of objects tend to be for example, but not limited to, pictures, images, graphics, photos and/or other visual formats that a user would have to print out or duplicate through a graphics or drawing program to use in a workflow process in the current art. Through the use of the image-group intelligent dynamic template type the user now has the ability to take an existing static object as illustrated with no defined boundaries or specific grid sections and create an image-group 604 template (FIG. 6a) that can be used to define data entry areas, description areas, additional images and sketches, groups, and overlay any other object type available on the digital workspace 105. This capability will be further defined in FIG. 6a and FIG. 6b and FIG. 6c.

FIG. 5a illustrates a graphical lightbulb which can be used in, for example, an ideation and brainstorming process. When inserted as part of an image-group 604 dynamic intelligent object and further populated with digital workspace objects, the image-group can be saved as a dynamic intelligent template object into a template library 808 for further use by other users. This allows the user to use their own free flowing process diagrams to create dynamic intelligent templates objects on any image backgrounds. Examples of other images/diagrams are further shown in the Venn diagram FIG. 5b and the Agile sprint retrospective diagram 501 in FIG. 5b. It should be noted that even photographs are with in the spirit of this invention and can be imported into the dynamic object manager 801 and turned into image-group templates. This allows for a tremendous flexibility, creativity and adaptability to form intelligent dynamic templates without the constraints outlined in the prior art.

Figure 6B:
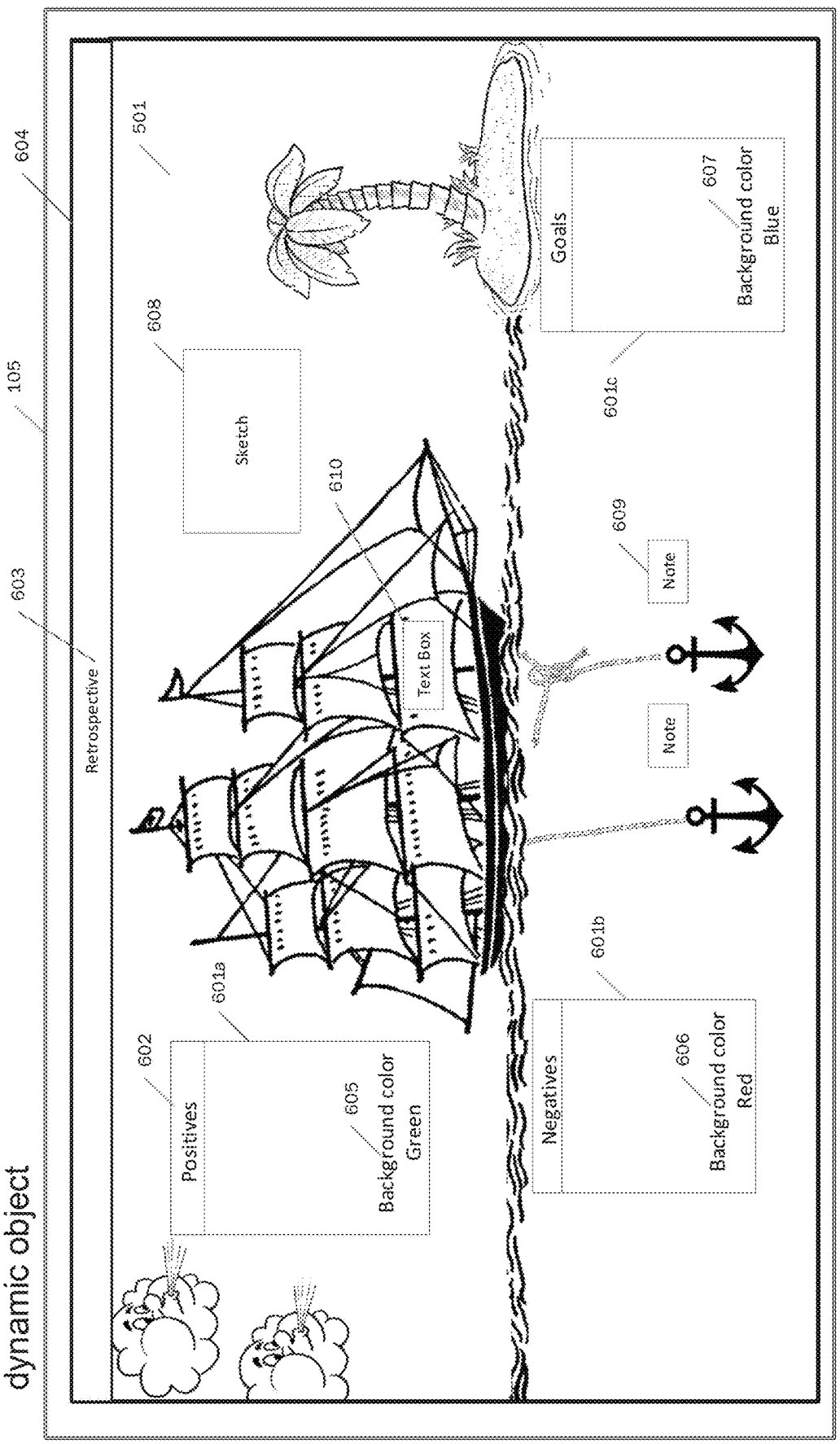

FIGS. 6a and 6b and 6c illustrate the graphical process of creating an image-group 604 object which can be further saved as an image-group intelligent dynamic template. The user running the program application preferably launches the dynamic object group manager as illustrated in FIG. 3. The user will select the image such as one shown in FIG. 5c of the Agile Sprint retrospective 501. FIG. 6a illustrates the image 501 being used as a background in the group object 113. This now converts the group object 113 to an image-group object 604 through the dynamic object manager 801, type manager 804. The image-group 604 is preferably displayed on the digital workspace 105. The user now has the option to adjust the image-group 604 attributes such as, but not limited to, color, label name, show/hide label, and show/hide pins. The attributes are preferably managed via the attribute manager 803. The color affects the visual appearance of the group, its borders and label areas (610) and also defines the color property of nested objects. The image-group name 603 is located at the top of the image-group and can be hidden by the hide label attribute. The image-group 603 hide pin attribute will prevent the interface from displaying the pin icon that represents the current state of the objects pin property.

The image-group name 603 is also used by the export manager 810 to label the object in the data export. The attributes can be adjusted at any time by any users with appropriate permissions in the digital workspace.

FIG. 6b illustrates how digital workspace objects can be inserted into the image-group 604 to create the basis of an intelligent dynamic image object which can be further saved as a template. Subgroups 601a, 601b, 601c have been added to the image-group object. The adding of sub groups allows for the user to create hierarchical groups and structured containers at specific areas on the diagram. The attributes of the groups can be set individually. Digital workspace objects 105 inserted and contained within each subgroup will inherit attributes, properties, rules and behaviors assigned to the specific group. For example, subgroup 601a has been assigned a background color of green 605, subgroup 601b has been assigned a background color of red 606, and sub group 601c has been assigned a background color of blue 607. Each subgroup has also been assign their own specific name as noted on the diagram. The position of the subgroups can be anywhere within the image-group borders allowing for total flexibility for the user to create templates of any type, style and complexity. Basic notes 609 and text box 610 and a sketch object 608 have also been added. The objects illustrated are examples of digital workspace objects, which can be any type of digital workspace object. The position of the digital workspace objects can be anywhere within the image group boundary's and even overlap.

FIG. 6c further illustrates how the user has added another layer of subgroups 603a, 603b within the subgroup 601b. Preferably, there are no constraints to limit the number of subgroups. As per FIG. 6b, each subgroup can have its own attributes and properties. Subgroup 601a has been populated with digital workspace objects of note 106, image 114, sketch 107 and ink 125. The behavior of notes 106 are such that they inherit the assigned background color attribute of the group. It should be noted that the users of the intelligent image-group are able to concurrently adjust any parameter at any time and contribute content.

Figure 7D:
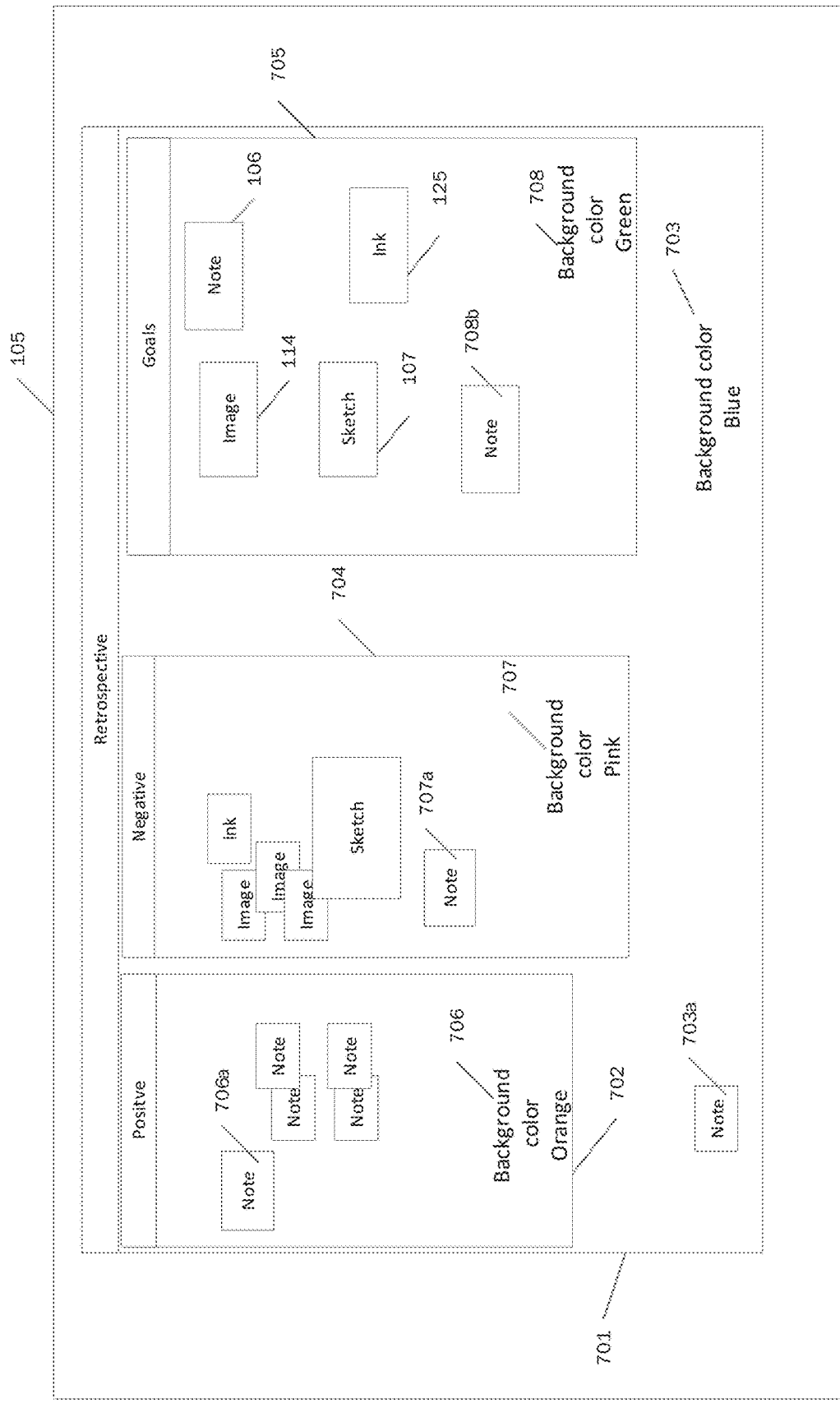

FIGS. 7a and 7b and 7c illustrate an intelligent group template object 701. The user starts with the digital workspace 105 and inserts a group object 701 onto the workspace 105 as outline in FIG. 4. This intelligent object type is almost the same as an image-group 604 template. The distinguishing difference is that there is no image/diagram inserted as a background in the group object. As such all of the attributes, behaviors, properties, and rules are the same as an image-group 604. The intelligent dynamic group object 701 can be saved as an intelligent dynamic template object once it has been appropriately configured by the user. FIG. 7b illustrates a group object that has had its attributes of background color set to blue 703. FIG. 7c illustrates a full configured and formatted intelligent dynamic group object with attributes set. Group 701 contains subgroups 702, 704, 705. Subgroup 702 has been set to a background color of orange 706 and a name of Positive 709. Subgroup 704 has been set to a background color of pink 707 and a name of Negative 710. At this point the user can save out the intelligent dynamic group as a template to be re-called later. Subgroup 705 has been set to a background color of green 708 and a name of Goals 711. FIG. 7d illustrates the intelligent dynamic group template object 701 populated with user inserted content for reference.

Both FIGS. 6a (604) and 7b (701) represent an agile process retrospective diagram. Although they differ significantly in form and structure, they are both able to be created and used using the dynamic object manager 801 and fully support the Agile retrospective process that two individual groups in an organization may be utilizing.

Figure 8:
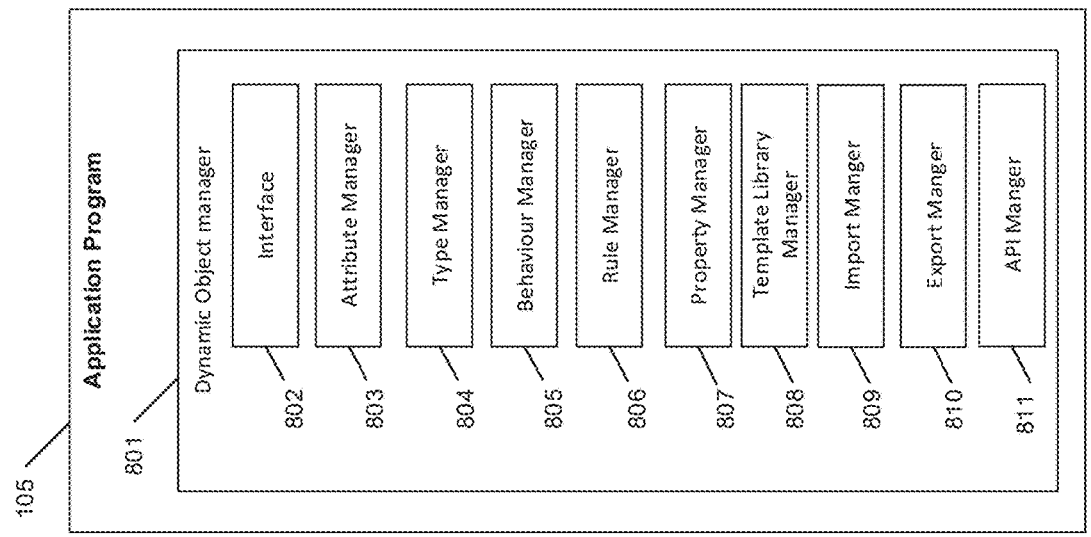
FIG. 8 is a diagrammatic layout of the dynamic object manager.

FIG. 8 is a layout of the component pieces of the dynamic intelligent object manager 801 which is preferably contained within the digital workspace program 105. The dynamic intelligent object manager 801 is made up of an interface 802, attribute manager 803, type manager 804, behavior manager 805, rule manager 806, property manager 807, template library manager 808, import manager 808, API Manager 811 and an export manager 810.

The interface manager 802 is preferably used by the user to accesses the dynamic intelligent object managers of the dynamic object manager 801. The digital workspace manager 105 preferably displays the interface 802 through user actions, as directed through the digital workspace 105. The interface 802 preferably accesses the appropriate dynamic object manager 801 manager 803,804,805,806,807,808,808, 810,811.

The attribute manager 803 is preferably used to manage the attributes associated with the various object types. An image-group and group have the following attributes but not limited to for example, color, label name, show/hide label and show/hide pins.

The type manager 804 is preferably used to create and convert objects to the specific object types selected by the user.

The behavior manager 805 preferably assigns and manages the behavior of the intelligent dynamic object. Examples of behaviors are to change the color, appearance, size or position of nested elements.

The rule manager 806 is preferably used to manage the macro rules that have been assigned to the intelligent template object.

The property manager 807 is preferably used to manage the specific properties assigned to the intelligent dynamic object. Examples of properties are location, size, z-order, author, layer assignment, objects contained within the hierarchy.

The template library manager 808 preferably manages the intelligent dynamic object template library. Typical library actions are load, view, save and import share.

The import manager 809 is preferably used to import template files and data that have been created previously by alternate applications. The import manager will preferably map and manage the data into the newly selected intelligent dynamic object type.

The export manager 810 preferably manages the export functions. The export manager is able to take the intelligent dynamic objects template data selected by the user and export the data to command data structures utilized by third party programs. Examples of data structure and xml supported schema, delimited text file spreadsheet, print documents and image formats (CSV, SVG, DOCX, XLS, PDF, PNG, JPEG).

The API manager 810 preferably manages the Application Programming Interface functions. The Application Programming Interface is used to access the functions, data, properties, attributes and rules programmatically of the data object manager 801.

The individual components shown in outline or designated by blocks in the attached Drawings are all well-known in the electronic processing arts, and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A method for creating dynamic, intelligent templates for displaying objects on at least one computer-controlled display, comprising:
    a first user displaying a static object on the at least one computer-controlled display;
    the first user converting the static object into a dynamic template object having attributes of a group, the group including at least two of (i) notes, (ii) text boxes, (iii) images, (iv) sketches, (v) embedded links, (vi) inking objects, and (vii) sub-groups;
    objects of the group inheriting specific behaviors and attributes of the group including at least two of (i) color, (ii) naming convention, and (iii) positional attributes;
    the conversion occurring when at least one of: (i) the attributes and behaviors of the group are added to the static object, and (ii) another underlying behavior is made available through interaction with the static object, wherein the dynamic template object is to determine the attributes and behaviors inherent to objects that are placed on or overlaid onto the dynamic template object;
    storing the dynamic template object in a template library; and
    a second user at least one of: (i) accessing the dynamic template object stored in the template library, (ii) making further change to the attributes or the contents of the accessed dynamic template object, (iii) saving a further changed dynamic template object in the template library, and (iv) displaying the accessed dynamic template object on the at least one computer-controlled display.

2. The method according to claim 1, wherein the group includes at least one sub-group, and wherein the group and the at least one sub-group form a nested hierarchal structure in at least one layer, and wherein at least one object in the at least one sub-group inherits at least one specific behavior of the group.

3. The method according to claim 2, wherein the group includes another sub-group disposed in a same layer as at least one of the at least one of the sub-groups.

4. The method according to claim 1, wherein the dynamic template object is configured so as to be exportable to a third party program as at least one of a delimited text schema and an xml schema.

5. The method according to claim 1, wherein the static object and the dynamic template object each comprise an image object.

6. The method according to claim 1, wherein other related objects including at least two of (i) text, (ii) notes, (iii) images, are enabled to be dragged onto a dynamic template image object.

7. Apparatus for creating dynamic, intelligent templates for displaying objects on at least one computer-controlled display, comprising:
    at least one processor configured for a first user to display a static object on the at least one computer-controlled display;
    the at least one processor being further configured for the first user to convert the static object into a dynamic template object having attributes of a group, the group including at least two of (i) notes, (ii) text boxes, (iii) images, (iv) sketches, (v) embedded links, (vi) inking objects, and (vii) sub-groups;
    the at least one processor being further configured such that objects of the group inherit specific behaviors and attributes of the group including at least two of (i) color, (ii) naming convention, and (iii) positional attributes;
    the at least one processor being further configured such that the conversion occurs when at least one of: (i) the attributes and behaviors of the group are added to the static object, and (ii) another underlying behavior is made available through interaction with the static object, wherein the dynamic template object is able to determine the attributes and behaviors inherent to objects that are placed on or overlaid onto the dynamic template object;
    the at least one processor being further configured such that the dynamic template object is stored in a template library; and
    the at least one processor being further configured such that a second user is enabled to perform at least one of: (i) accessing the dynamic template object stored in the template library, (ii) making further change to the attributes or the contents of the accessed dynamic template object, (iii) saving a further changed dynamic template object in the template library, and (iv) displaying the accessed dynamic template object on the at least one computer-controlled display.

8. The apparatus according to claim 7, wherein the at least one processor provides that the group includes at least one sub-group, and wherein the group and the at least one sub-group form a nested hierarchal structure in at least one layer, and wherein at least one object in the at least one sub-group inherits at least one specific behavior of the group.

9. The apparatus according to claim 8, wherein the at least one processor provides that the group includes another sub-group disposed in a same layer as at least one of the at least one sub-groups.

10. The apparatus according to claim 7, wherein the at least one processor provides that the dynamic template object is configured so as to be exportable to a third party program as at least one of a delimited text schema and an xml schema.

11. The apparatus according to claim 7, wherein the at least one processor provides that the static object and the dynamic template object each comprise an image object.

12. The apparatus according to claim 11, wherein the at least one processor provides that other related objects including at least two of (i) text, (ii) notes, (iii) images are enabled to be dragged onto a dynamic template image object.

13. Program code embodied in a non-transitory computer readable medium for creating dynamic, intelligent templates for displaying objects on at least one computer- controlled display, said program comprising instructions causing at least one processor to:
   enable a first user to display a static object on the at least one computer-controlled display;
   enable the first user to convert the static object into a dynamic template object having attributes of a group, the group including at least two of (i) notes, (ii) text boxes, (iii) images, (iv) sketches, (v) embedded links, (vi) inking objects, and (vii) sub-groups;
   wherein objects of the group inherit specific behaviors and attributes of the group including at least two of (i) color, (ii) naming convention, and (iii) positional attributes;
   wherein the conversion occurs when at least one of: (i) the attributes and behaviors of the group are added to the static object, and (ii) another underlying behavior is made available through interaction with the static object, wherein the dynamic template object is able to determine the attributes and behaviors inherent to objects that are placed on or overlaid onto the dynamic template object;
   cause the dynamic template object to be stored in a template library; and
   enable a second user at least one of: (i) accessing the dynamic template object stored in the template library, (ii) making further change to the attributes or the contents of the accessed dynamic template object, (iii) saving a further changed dynamic template object in the template library, and (iv) displaying the accessed dynamic template object on the at least one computer-controlled display.

14. The program code according to claim 13, wherein the program code causes the at least one processor to provide that the group includes at least one sub-group, and wherein the group and the at least one sub-group form a nested hierarchal structure in at least one layer, and wherein at least one object in the at least one sub-group inherits at least one specific behavior of the group.

15. The program code according to claim 14, wherein the program code causes the at least one processor to provide that the group includes another sub-group disposed in a same layer as at least one of the at least one sub-groups.

16. The program code according to claim 13, wherein the program code causes the at least one processor to provide that the dynamic template object is configured so as to be exportable to a third party program as at least one of a delimited text schema and an xml schema.

17. The program code according to claim 13, wherein the program code causes the at least one processor to provide that the static object and the dynamic template object each comprise an image object.

18. The program code according to claim 17, wherein the program code causes the at least one processor to provide that other related objects including at least two of (i) text, (ii) notes, (iii) images are enabled to be dragged onto a dynamic template image object.

* * * * *